US007685076B2

(12) United States Patent
Moore et al.

(10) Patent No.: US 7,685,076 B2
(45) Date of Patent: Mar. 23, 2010

(54) ONLINE REDUCTION IN REPAIR AND MAINTENANCE COSTS

(75) Inventors: Clyde R. Moore, Paradise Valley, AZ (US); Michael A. Ferreira, Arnold, MD (US); Michael A. Russell, Ellicott City, MD (US); J. Russell Joyner, Laurel, MD (US)

(73) Assignee: First Service Networks, Inc., Linthicum, MD (US)

( * ) Notice: Subject to any disclaimer, the term of this patent is extended or adjusted under 35 U.S.C. 154(b) by 1330 days.

(21) Appl. No.: 11/034,689

(22) Filed: Jan. 13, 2005

(65) Prior Publication Data

US 2006/0155616 A1 Jul. 13, 2006

(51) Int. Cl.
*G06F 17/00* (2006.01)

(52) U.S. Cl. ............................ 705/400; 705/16; 705/29

(58) Field of Classification Search ....................... None
See application file for complete search history.

(56) References Cited

U.S. PATENT DOCUMENTS 6,070,155 A * 5/2000 Cherrington et al. ........ 705/400
7,302,410 B1 * 11/2007 Venkatraman et al. ........ 705/35
2005/0091260 A1 * 4/2005 Carroll et al. ............... 707/102
2006/0010152 A1 * 1/2006 Catalano et al. ............. 707/102

OTHER PUBLICATIONS

"Get written estimate for repairs Series: Action", Paradis, Nancy, St. Petersburg Times, Oct. 22, 2000, p. 2.*

* cited by examiner

*Primary Examiner*—F. Zeender
*Assistant Examiner*—M. Thein
(74) *Attorney, Agent, or Firm*—Hoffman & Baron, LLP

(57) ABSTRACT

The present invention provides an automated invoice vetting, negotiation and payment system that automatically collects goods and labors hour data, sets a reasonable pricing structure for each such good and service, dynamically analyzes the price data to adjust for market changes and provides a automatic negotiation and settlement feature for bill payment. The present invention readily accommodates the above features over electronic networks such as the Internet. The present invention therefore provides a method of payment of invoices of vendors by purchasers, comprising providing a settlement authority with invoice information from a vendor, comparing the invoice charges to a predetermined range of values for the charges, accepting the charges that are within a predetermined sub-range for the charges, adjusting the charges that are greater or less than that the predetermined sub-range for the charges and paying the accepted charges and the adjusted charges.

20 Claims, 14 Drawing Sheets

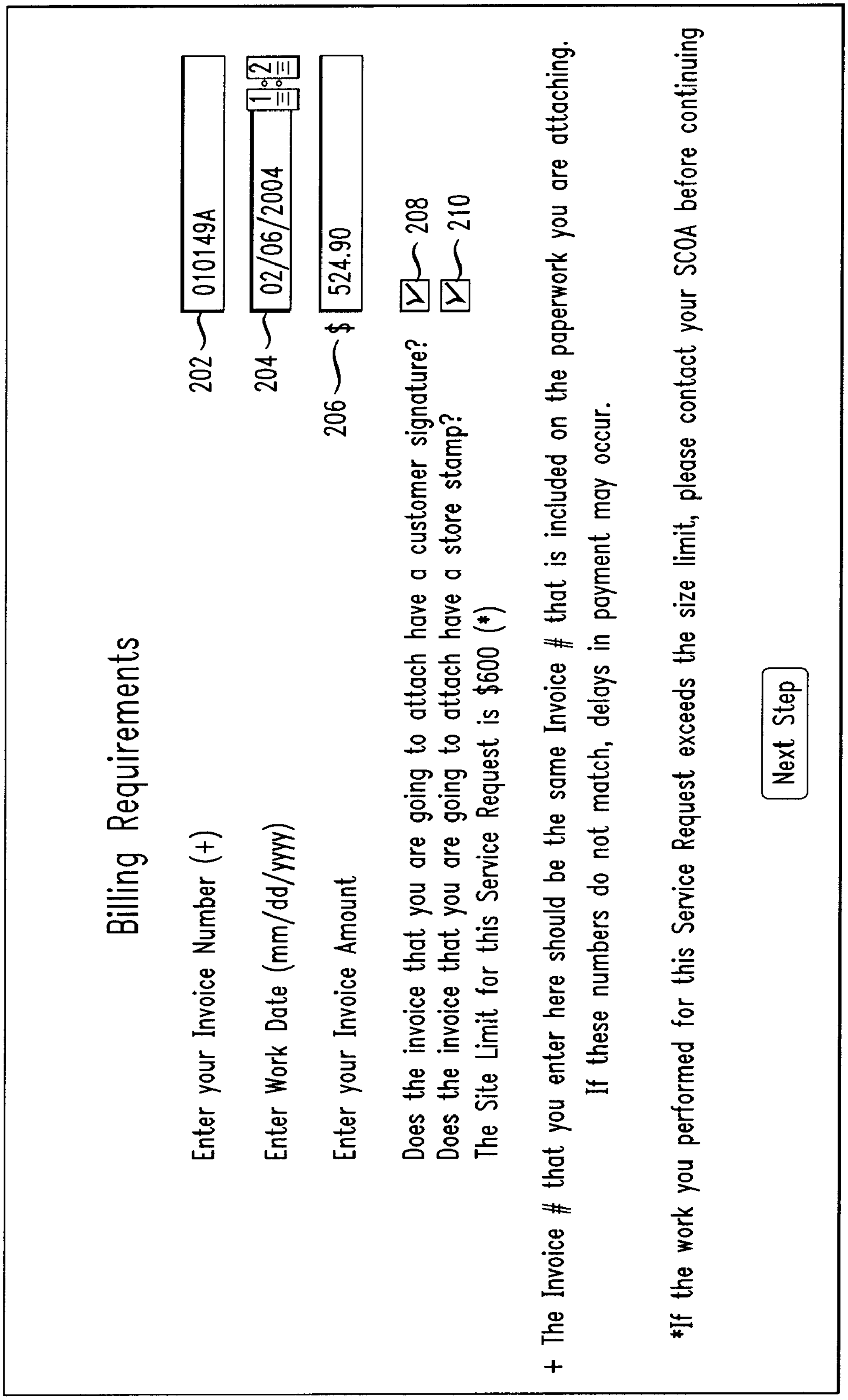

FIG. 2

Billing Requirements

Enter your Invoice Number (+)    202 — [ 010149A ]

Enter Work Date (mm/dd/yyyy)    204 — [ 02/06/2004 ]

Enter your Invoice Amount    206 — $ [ 524.90 ]

Does the invoice that you are going to attach have a customer signature? [✓] — 208
Does the invoice that you are going to attach have a store stamp? [✓] — 210
The Site Limit for this Service Request is $600 (*)

[ Next Step ]

+ The Invoice # that you enter here should be the same Invoice # that is included on the paperwork you are attaching.
     If these numbers do not match, delays in payment may occur.

*If the work you performed for this Service Request exceeds the size limit, please contact your SCOA before continuing

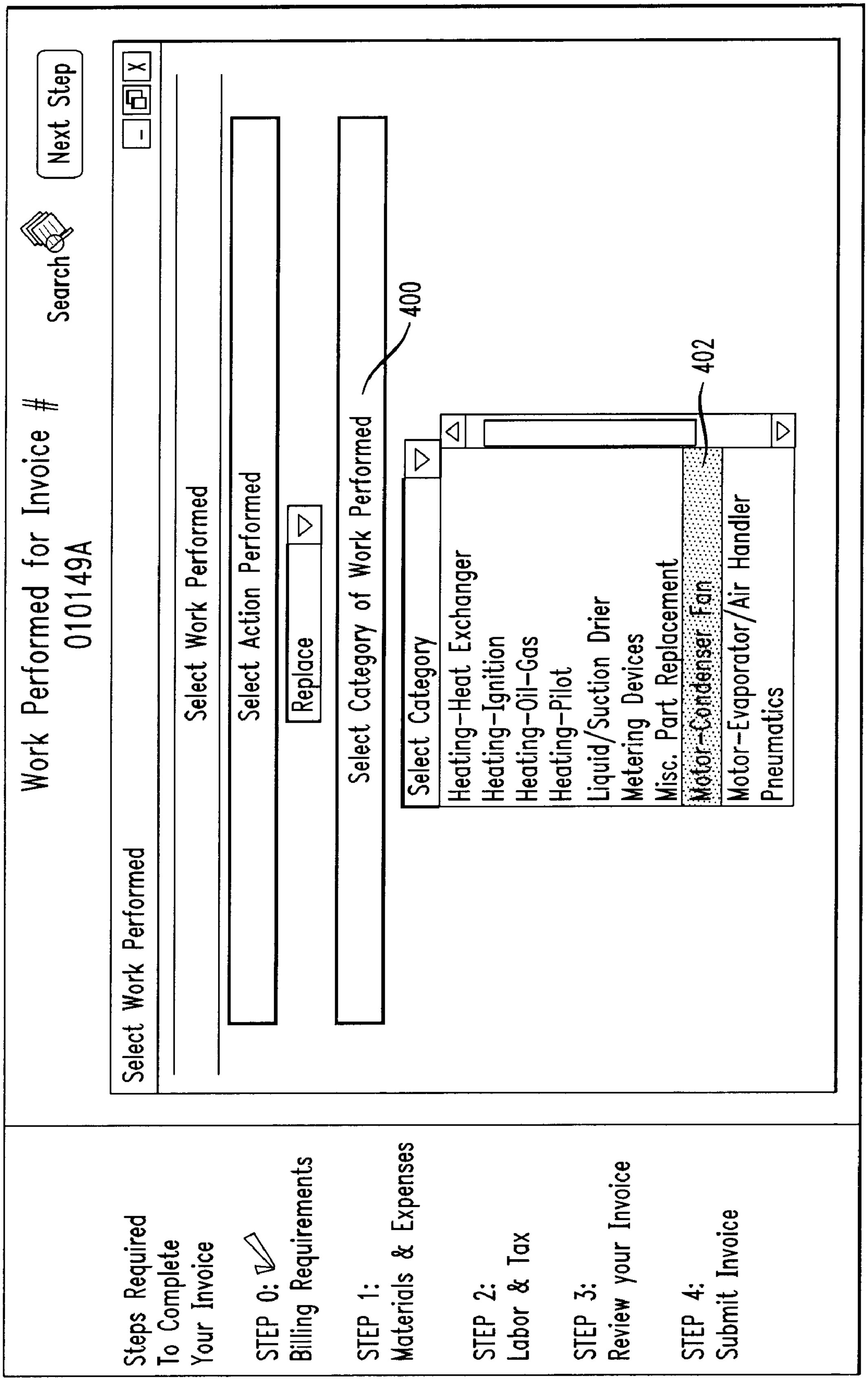

FIG. 4

Steps Required To Complete Your Invoice

STEP 0: ✓
Billing Requirements

STEP 1:
Materials & Expenses

STEP 2:
Labor & Tax

STEP 3:
Review your Invoice

STEP 4:
Submit Invoice

---

Work Performed for Invoice # 010149A   Search 📖   [Next Step]

Select Work Performed

Select Work Performed

Select Action Performed
[Replace �считать▽]

Select Category of Work Performed — 400

| Select Category ▽ |
|---|
| Heating–Heat Exchanger |
| Heating–Ignition |
| Heating–Oil-Gas |
| Heating–Pilot |
| Liquid/Suction Drier |
| Metering Devices |
| Misc. Part Replacement |
| Motor–Condenser Fan | ← 402
| Motor–Evaporator/Air Handler |
| Pneumatics |

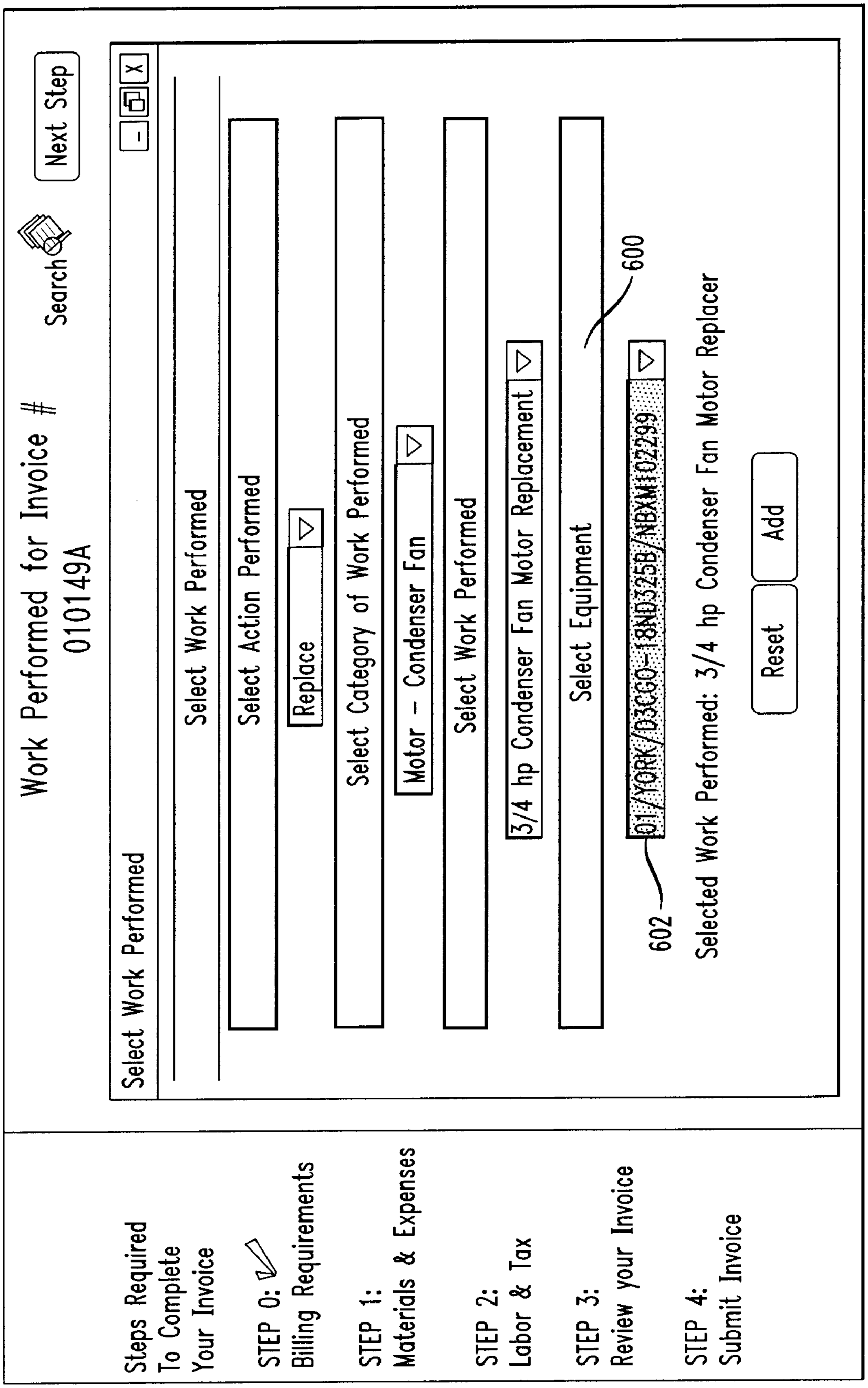

FIG. 6

Steps Required To Complete Your Invoice

STEP 0: Billing Requirements ✓

STEP 1: Materials & Expenses

STEP 2: Labor & Tax

STEP 3: Review your Invoice

STEP 4: Submit Invoice

---

Work Performed for Invoice # 010149A

Search 🔍    [ Next Step ]

[ − | □ | X ]

Select Work Performed
_____

Select Work Performed
_____

Select Action Performed
[ Replace ▽ ]

Select Category of Work Performed
[ Motor – Condenser Fan ▽ ]

Select Work Performed
[ 3/4 hp Condenser Fan Motor Replacement ▽ ] — 600

Select Equipment
[ 01/YORK/D3CG0-18ND325B/NBXM10229.9 ▽ ] — 602

Selected Work Performed: 3/4 hp Condenser Fan Motor Replacer

[ Reset ]   [ Add ]

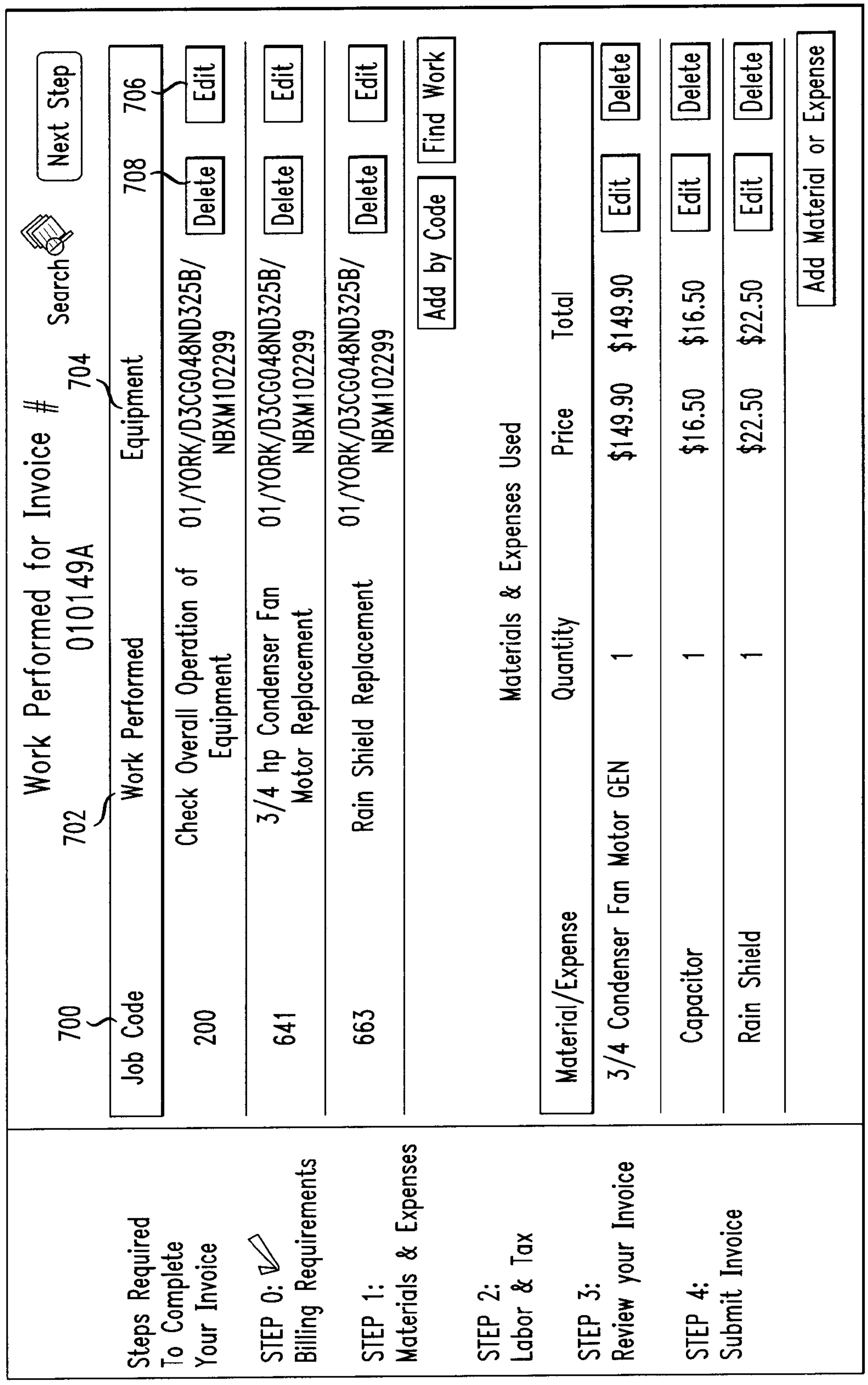

FIG. 7

Work Performed for Invoice # 010149A

| Job Code | Work Performed | Equipment | | |
|---|---|---|---|---|
| 200 | Check Overall Operation of Equipment | 01/YORK/D3CG048ND325B/NBXM102299 | Delete | Edit |
| 641 | 3/4 hp Condenser Fan Motor Replacement | 01/YORK/D3CG048ND325B/NBXM102299 | Delete | Edit |
| 663 | Rain Shield Replacement | 01/YORK/D3CG048ND325B/NBXM102299 | Delete | Edit |

Add by Code | Find Work

Materials & Expenses Used

| Material/Expense | Quantity | Price | Total | | |
|---|---|---|---|---|---|
| 3/4 Condenser Fan Motor GEN | 1 | $149.90 | $149.90 | Edit | Delete |
| Capacitor | 1 | $16.50 | $16.50 | Edit | Delete |
| Rain Shield | 1 | $22.50 | $22.50 | Edit | Delete |

Add Material or Expense

Steps Required To Complete Your Invoice

STEP 0: Billing Requirements
STEP 1: Materials & Expenses
STEP 2: Labor & Tax
STEP 3: Review your Invoice
STEP 4: Submit Invoice Search
Next Step 700, 702, 704, 706, 708

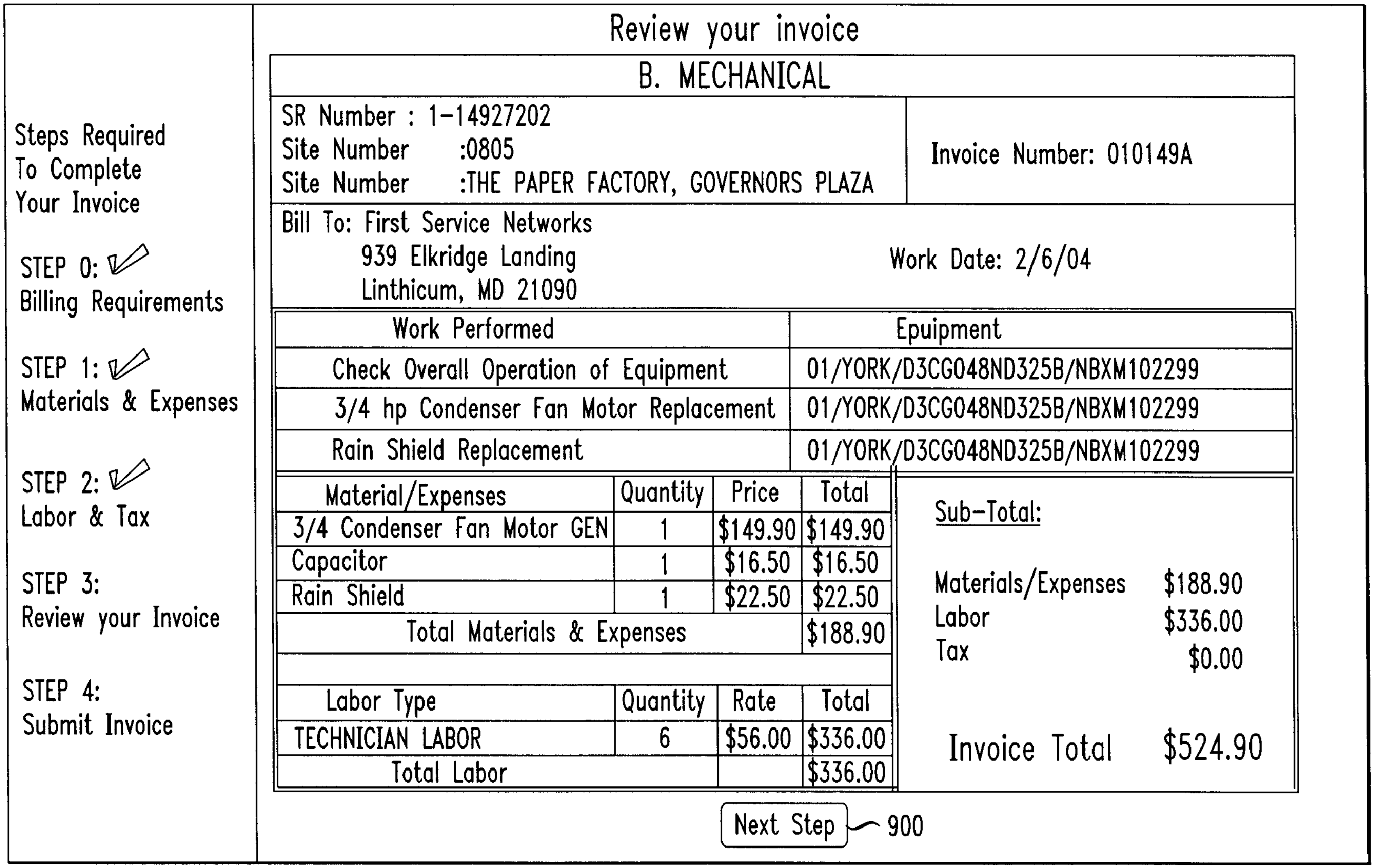

FIG. 9

Review your invoice

Steps Required To Complete Your Invoice

STEP 0: ✓ Billing Requirements

STEP 1: ✓ Materials & Expenses

STEP 2: ✓ Labor & Tax

STEP 3: Review your Invoice

STEP 4: Submit Invoice

B. MECHANICAL

Invoice Number: 010149A

SR Number : 1-14927202
Site Number :0805
Site Number :THE PAPER FACTORY, GOVERNORS PLAZA Bill To: First Service Networks
939 Elkridge Landing
Linthicum, MD 21090

Work Date: 2/6/04

| Work Performed | Equipment |
|---|---|
| Check Overall Operation of Equipment | 01/YORK/D3CG048ND325B/NBXM102299 |
| 3/4 hp Condenser Fan Motor Replacement | 01/YORK/D3CG048ND325B/NBXM102299 |
| Rain Shield Replacement | 01/YORK/D3CG048ND325B/NBXM102299 |

| Material/Expenses | Quantity | Price | Total |
|---|---|---|---|
| 3/4 Condenser Fan Motor GEN | 1 | $149.90 | $149.90 |
| Capacitor | 1 | $16.50 | $16.50 |
| Rain Shield | 1 | $22.50 | $22.50 |
| Total Materials & Expenses | | | $188.90 |

| Labor Type | Quantity | Rate | Total |
|---|---|---|---|
| TECHNICIAN LABOR | 6 | $56.00 | $336.00 |
| Total Labor | | | $336.00 |

Sub-Total:

Materials/Expenses $188.90
Labor $336.00
Tax $0.00

Invoice Total $524.90

[ Next Step ] — 900

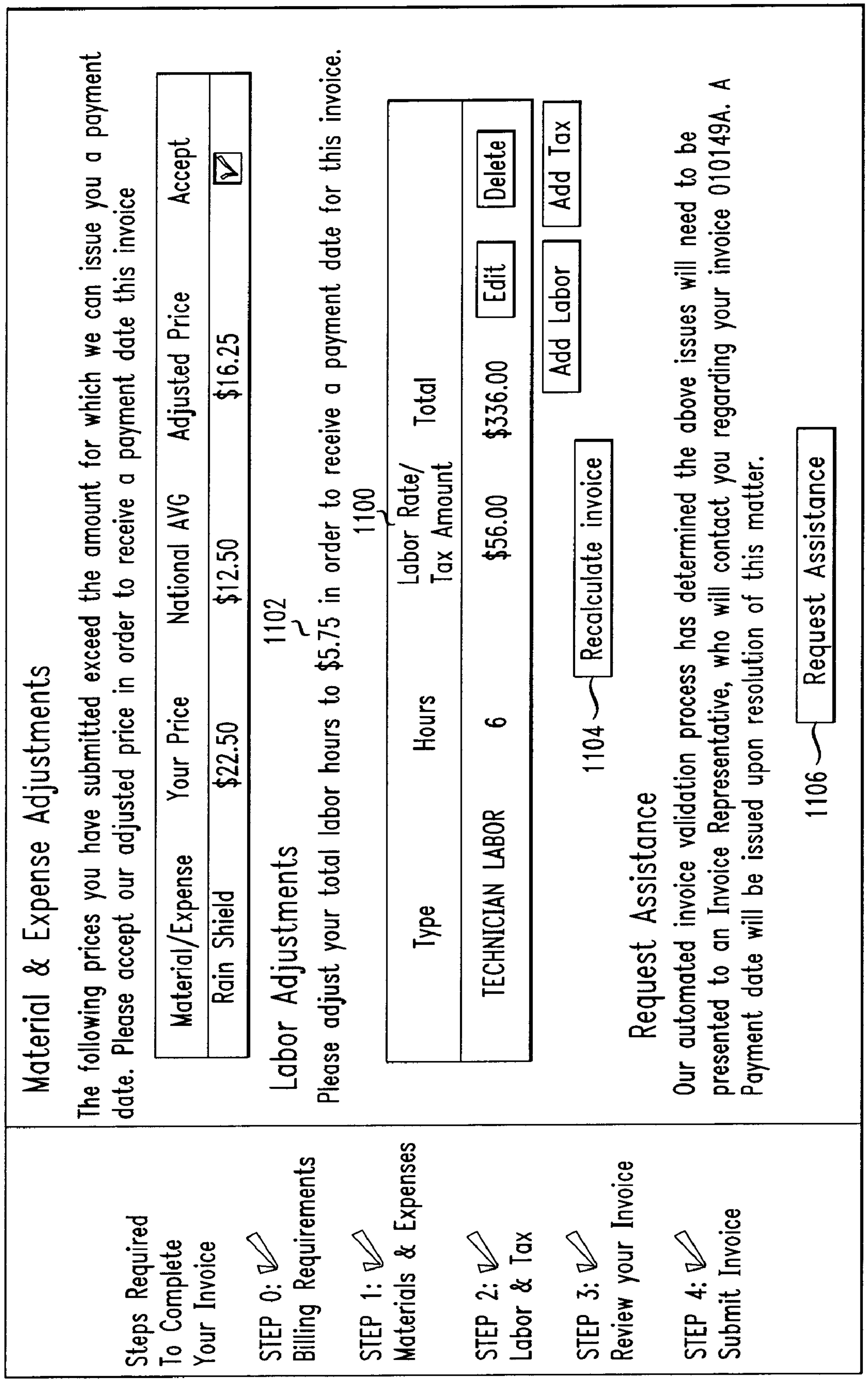

FIG. 11

Steps Required
To Complete
Your Invoice

STEP 0: ✓
Billing Requirements

STEP 1: ✓
Materials & Expenses

STEP 2: ✓
Labor & Tax

STEP 3: ✓
Review your Invoice

STEP 4: ✓
Submit Invoice

Material & Expense Adjustments

The following prices you have submitted exceed the amount for which we can issue you a payment date. Please accept our adjusted price in order to receive a payment date this invoice

| Material/Expense | Your Price | National AVG | Adjusted Price | Accept |
|---|---|---|---|---|
| Rain Shield | $22.50 | $12.50 | $16.25 | ✓ |

Labor Adjustments

Please adjust your total labor hours to $5.75 in order to receive a payment date for this invoice. — 1100

1102

| Type | Hours | Labor Rate/ Tax Amount | Total | | |
|---|---|---|---|---|---|
| TECHNICIAN LABOR | 6 | $56.00 | $336.00 | Edit | Delete |
| | | | Add Labor | | Add Tax |

1104 — Recalculate invoice

Request Assistance

Our automated invoice validation process has determined the above issues will need to be presented to an Invoice Representative, who will contact you regarding your invoice 010149A. A Payment date will be issued upon resolution of this matter.

1106 — Request Assistance

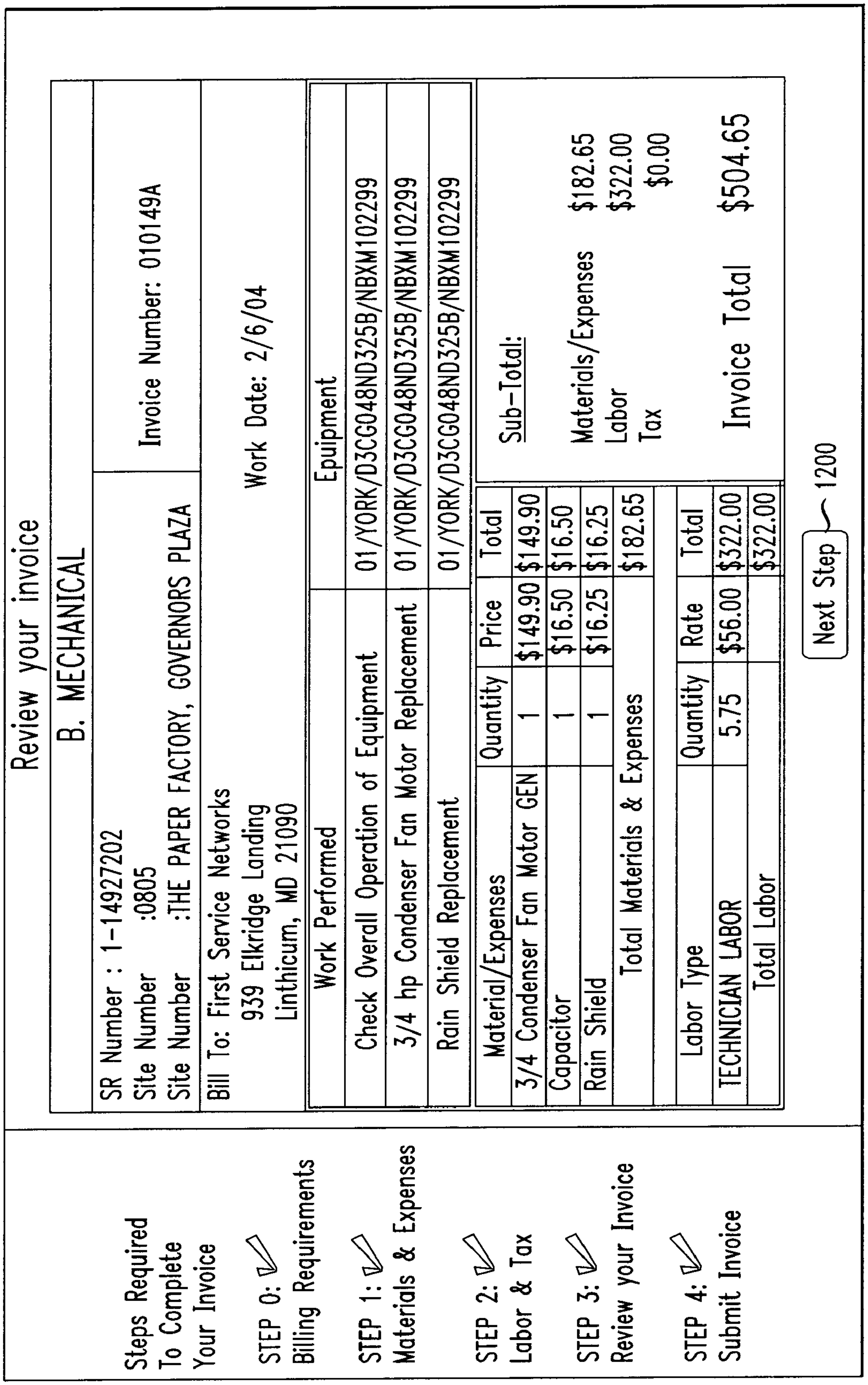

FIG. 12

Steps Required To Complete Your Invoice

STEP 0: ✓ Billing Requirements

STEP 1: ✓ Materials & Expenses

STEP 2: ✓ Labor & Tax

STEP 3: ✓ Review your Invoice

STEP 4: ✓ Submit Invoice

Review your invoice

B. MECHANICAL

SR Number : 1-14927202  
Site Number  :0805  
Site Number  :THE PAPER FACTORY, GOVERNORS PLAZA Bill To: First Service Networks  
939 Elkridge Landing  
Linthicum, MD 21090

Invoice Number: 010149A  
Work Date: 2/6/04

| Work Performed | Equipment |
|---|---|
| Check Overall Operation of Equipment | 01/YORK/D3CG048ND325B/NBXM102299 |
| 3/4 hp Condenser Fan Motor Replacement | 01/YORK/D3CG048ND325B/NBXM102299 |
| Rain Shield Replacement | 01/YORK/D3CG048ND325B/NBXM102299 |

| Material/Expenses | Quantity | Price | Total |
|---|---|---|---|
| 3/4 Condenser Fan Motor GEN | 1 | $149.90 | $149.90 |
| Capacitor | 1 | $16.50 | $16.50 |
| Rain Shield | 1 | $16.25 | $16.25 |
| Total Materials & Expenses | | | $182.65 |

| Labor Type | Quantity | Rate | Total |
|---|---|---|---|
| TECHNICIAN LABOR | 5.75 | $56.00 | $322.00 |
| Total Labor | | | $322.00 |

Sub-Total:

Materials/Expenses  $182.65  
Labor  $322.00  
Tax  $0.00

Invoice Total  $504.65

[ Next Step ]—1200

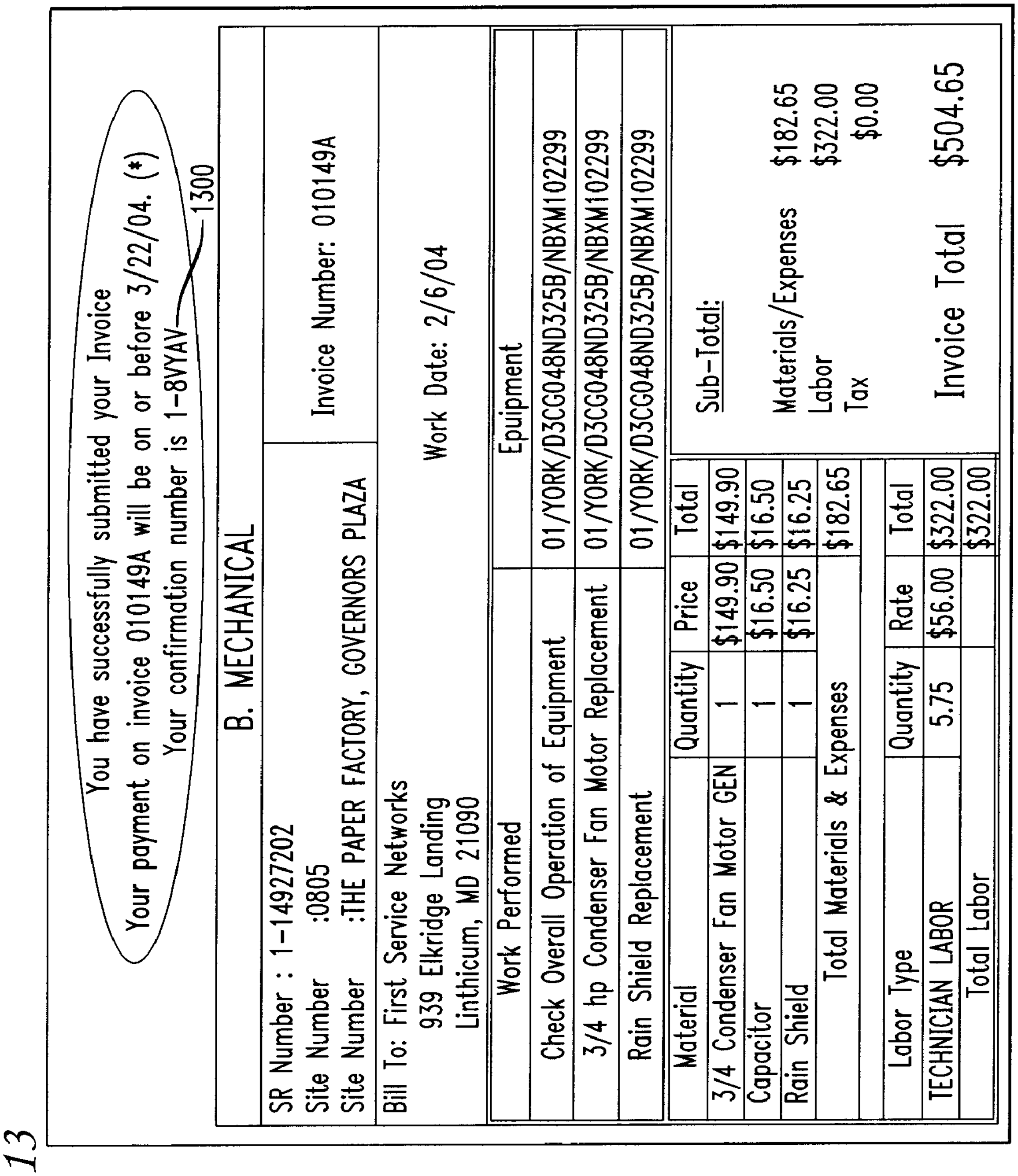

*FIG. 13*

You have successfully submitted your Invoice
Your payment on invoice 010149A will be on or before 3/22/04. (*)
Your confirmation number is 1-8VYAV ——1300

B. MECHANICAL

| | Invoice Number: 010149A |
|---|---|

SR Number : 1-14927202
Site Number   :0805
Site Number   :THE PAPER FACTORY, GOVERNORS PLAZA Bill To: First Service Networks
939 Elkridge Landing
Linthicum, MD 21090

Work Date: 2/6/04

| Work Performed | Equipment |
|---|---|
| Check Overall Operation of Equipment | 01/YORK/D3CG048ND325B/NBXM102299 |
| 3/4 hp Condenser Fan Motor Replacement | 01/YORK/D3CG048ND325B/NBXM102299 |
| Rain Shield Replacement | 01/YORK/D3CG048ND325B/NBXM102299 |

| Material | Quantity | Price | Total |
|---|---|---|---|
| 3/4 Condenser Fan Motor GEN | 1 | $149.90 | $149.90 |
| Capacitor | 1 | $16.50 | $16.50 |
| Rain Shield | 1 | $16.25 | $16.25 |
| Total Materials & Expenses | | | $182.65 |

| Labor Type | Quantity | Rate | Total |
|---|---|---|---|
| TECHNICIAN LABOR | 5.75 | $56.00 | $322.00 |
| Total Labor | | | $322.00 |

Sub-Total:

Materials/Expenses  $182.65
Labor               $322.00
Tax                   $0.00

Invoice Total   $504.65

ONLINE REDUCTION IN REPAIR AND MAINTENANCE COSTS

FIELD OF THE INVENTION

This invention relates to an automated online negotiation, payment, collection and cost monitoring system and method for optimizing the costs and expense associated with the purchase of goods and services having highly variable and non-uniform pricing.

BACKGROUND OF THE INVENTION

Determining the fair and reasonable charges for the purchase of non-standard goods and services can be difficult due to the large number of variables present in pricing. It is further especially difficult to negotiate prices in advance of the purchase of goods or services having a large and variable set of parameters influencing pricing. An example of an industry where this problem is manifest in the service repair industry. In the service repair industry the setting and standardization of pricing is difficult to achieve due to several factors. First, by definition, service repair work is highly random in that it involves the diagnosis of a problem on varied types of machinery, each having a unique installation. For example, a problem with a malfunctioning HVAC system in a building may be caused by one of several components, such as a compressor or air handler, in addition, many different brands of components could be in use in a single installation, thus requiring knowledge of the specifications of many different brands of components. Furthermore, each installation is different due to factors such as varied building architecture, and geographic location. Secondly, when a service repair order is placed it is usually impossible to know the extent of the repairs needed in terms of parts and labor. Furthermore, during the repair process, what may have been diagnosed as a simple repair may be revealed to be much more complex and time consuming. Thirdly, the cost for parts can be highly variable depending on a variety of factors; such as the relationship between the buyer and seller, the volume of parts purchased, and the geographic location of the supplier. Finally, the amount of time to perform a repair is also highly variable and difficult to estimate due to many of the factors already enumerated.

Therefore it is very difficult to arrive at a fair and reasonably negotiated price for a particular repair prior to performing the repair. This situation can leave the purchaser in a position of having to accept inflated pricing for repairs because of the inability to negotiate a price or compare pricing for similar work.

An example of this situation is available in the automotive repair industry, especially with respect to warranty repairs. In the automotive repair industry, warranty repairs fees are typically paid to the dealership performing the service based on a set time and parts allowance for a particular repair. For example, a head gasket replacement would be allotted a time period for labor, such as 5 hours and a parts allowance for all necessary parts, the dealer would be paid a fee based upon the set parts and labor standards. This is possible for the automotive industry due to the high degree of standardization for all cars. In each case every part is in the exact same position in a particular model and the parts needed for a repair are readily identifiable. However, the automotive repair situation is unlike the service repair industry in that the automotive repair industry is highly standardized and the statistical sample size for automotive repairs is very large, therefore it is rather easy to determine the value of a particular repair.

Therefore, what is needed is an automated system that provides a method to determine the fair and reasonable cost for non-standardized repairs services, having highly variable parameters which affect the cost.

A second problem that is encountered with respect to the negotiation and payment of service repair bills is the manual bill receipt and payment system. Conventional bill payment is based on the receipt by mail of a paper statement from each service or goods establishment for a billing period or for a particular job or task. This is typical for both household bills as well as businesses. However, the task can be especially cumbersome for businesses dealing with a large number of bills in addition to the need for a high degree of accuracy and cost monitoring associated with the running of a business.

The tracking of costs associated with the purchase of goods and services is a high priority need of most businesses. This is especially true when there are many vendors. One of the most difficult aspects of tracking and managing costs encountered where there are multiple vendors is the standardization of pricing for identical and/or similar goods and services.

Typically, the payment of invoices from vendors is done either completely manually, (i.e. by an accounts payable clerk) who reviews and pays each invoice in accordance with for example a work order which specifies the work performed. The clerk must review the invoice and make a determination if it matches the work order and secondly whether the billed charges are fair and reasonable under the circumstances. This analysis can require a lengthy process of comparing work orders and a high degree of institutional knowledge regarding the cost of many items or tasks. Any knowledge that the clerk does not immediately possess must be determined from a reference source. In addition, any amount that is disputed as incorrect, for example, the charge for a good is too high or the amount of time charged for a task is too long then requires a lengthy process to resolve involving the clerk contacting the vendor and negotiating a price adjustment.

Even when this process is completed using a computer to assist in the process the vetting and negotiation process must still be handled by a clerk manually, which is both time consuming and inefficient.

Furthermore, when the vetting and negotiation process is handled manually, there can be a lack of uniformity in the prices negotiated for identical goods and/or services. For example, a clerk may not recognize or remember the pricing for a particular good and in one instance negotiate a reduction from a billed charge and in another case pay the billed amount. This can lead to inefficiencies in that by not having a uniform and standard payment rate for all good and services typically purchased, and excess payments may occur. In addition, a bill may not be presented soon after the work is performed, which can lead to the details of a particular job being forgotten during the delay. If details are forgotten, then the vendor may not remember the reason for a particular charge and may not be willing to accept a negotiated sum for that charge.

Thus, what is needed is an automated bill payment system that eliminates the manual vetting and negotiation of service and goods prices. The system should be easily adaptable to use with a large number of vendors. The system further should be able to maintain a database of many goods and services as well as a pricing structure for each. In addition, the system should be able to dynamically adjust the pricing of each good and/or service based on changes in the marketplace, provide immediate feedback on the reasonableness of the charges and automatically propose adjustments. The system should readily accommodate and directly facilitate the eventual transition to full electronic bill presentment and payment over electronic networks.

SUMMARY OF THE INVENTION

The present invention provides a purchasing system to negotiate and standardize pricing for buying non-standard services with highly variable price parameters. The present invention further provides an automated bill vetting, negotiation and payment system that automatically collects goods and labors hour data, sets a reasonable pricing structure for each such good and service, dynamically analyzes the price data to adjust for market changes and provides a automatic negotiation and settlement feature for bill payment. The present invention readily accommodates the above features over electronic networks such as the Internet.

The present invention therefore provides a method of payment of invoices of vendors by purchasers, comprising providing a settlement authority with invoice information from a vendor; comparing the invoice charges to a predetermined range of values for said charges; accepting said charges that are within a predetermined sub-range for said charges; adjusting said charges that are greater or less than that said predetermined sub-range for said charges; and paying said accepted charges and said adjusted charges.

The present invention further provides a computer program containing code segments which when executed on a computer perform invoice settlement utilizing a network, the computer program embodied on a computer readable medium, the computer program comprising a code segment for allowing a vendor to select from a group of options in order to enter invoice information utilizing a network, wherein the options include action performed, work category, work performed, equipment and labor, a code segment for receiving the selected options utilizing the network, a code segment for comparing the invoice charges to a predetermined range of values for said charges, a code segment for accepting said charges that are within a predetermined sub-range for said charges, a code segment for adjusting said charges that are greater or less than that said predetermined sub-range for said charges; and a code segment for paying said accepted charges and said adjusted charges.

The inventive process results in several benefits, specifically, Provides a method to determine the fair and reasonable cost for non-standardized repairs services, having highly variable parameters which affect the cost. Provides an on-line real time network to standardize the invoicing process creates comparability of an otherwise diverse and complex billing process. Provides a large database of historical standardized billing information enables the setting of a sophisticated pricing model for each good and service. Those prices which fall outside of an acceptable range are therefore easily flagged for further review. Provides a real time network, such as the Internet to allow vendors to interact directly with the system while data is timely. Vendors are thus more likely to recall the reason for any unusual charges and more receptive to adjustment where warranted. Provides automatic and immediate feedback with respect to price adjustments and payment terms.

BRIEF DESCRIPTION OF THE DRAWINGS

FIG. 2 is a depiction of an exemplary start page in accordance with the present invention.

FIG. 4 is an additional exemplary Materials and Expense data entry page according to the present invention.

FIG. 6 is an additional exemplary Materials and Expense data entry page according to the present invention.

FIG. 7 is an exemplary Materials and Expense summary page according to the present invention.

FIG. 9 is an exemplary Invoice review page according to the present invention.

FIG. 11 is an exemplary adjustment review page according to the present invention.

FIG. 12 is an exemplary Final Invoice review page according to the present invention.

FIG. 13 is an exemplary Final Invoice and approval page according to the present invention.

DETAILED DESCRIPTION OF THE PREFERRED EMBODIMENT

Figure 1:
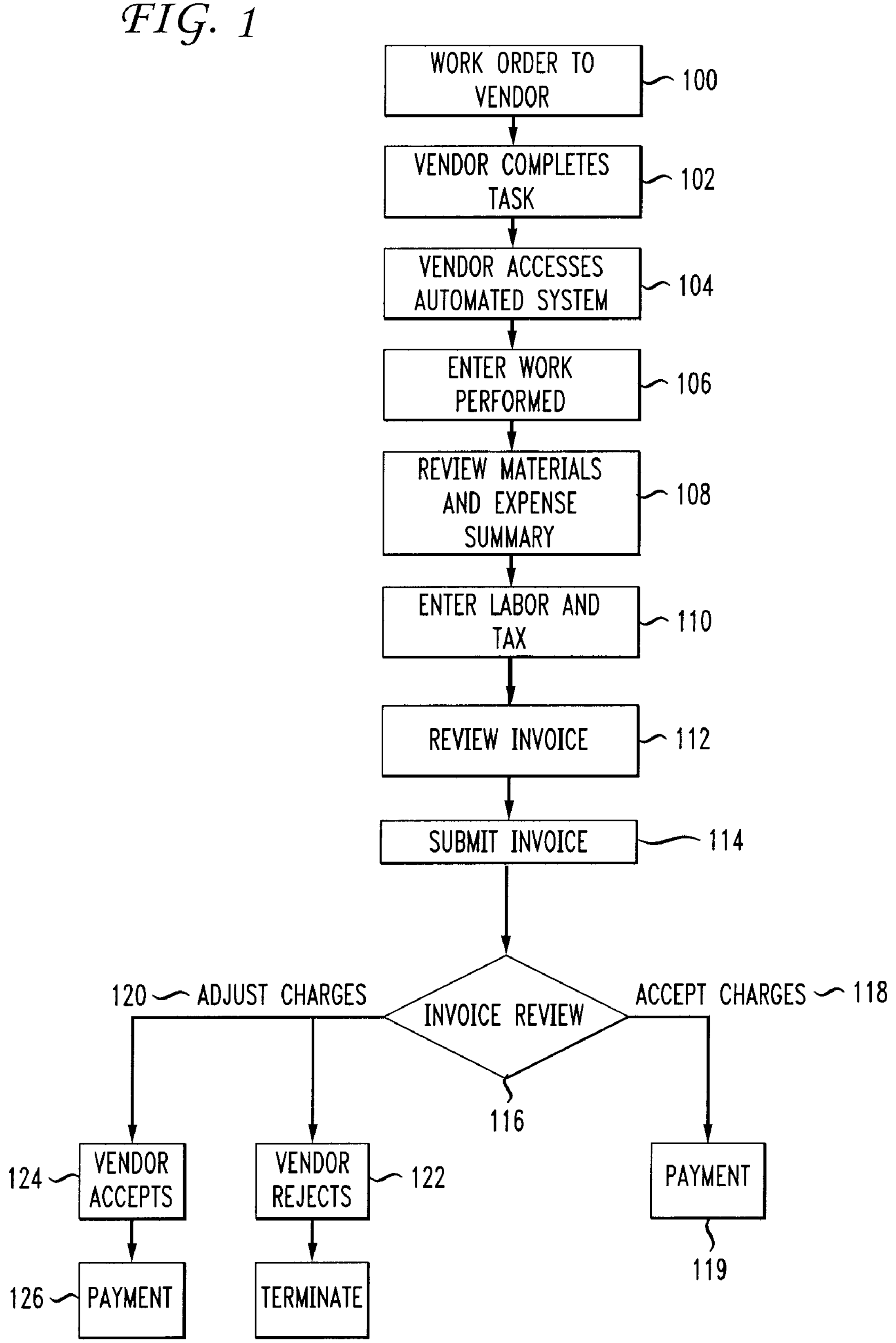
FIG. 1 is a flow chart depicting the process steps of the current invention.

There will be detailed below the preferred embodiments of the present invention with reference to the accompanying drawings. Like members are designated by like reference characters in all figures.

The present invention is directed online negotiation, payment, collection and cost monitoring system and method for optimizing the costs and expense associated with the purchase of goods and services having highly variable and non-uniform pricing.

Turning now to the drawings, FIG. 1 depicts a flow chart showing the steps for processing a bill payment in accordance with the present invention. For the purposes of this description, the present invention will be described with respect to the purchase and billing of the replacement and installation of a motor-condenser fan and associated parts. It should be understood that the example described is just for illustrative purposes and is meant to simplify the description. However, one skilled in the art will readily understand that the process and system is adaptable to the purchase of a wide variety of goods and services. Initially a purchaser of goods or services such as a business will contact a vendor to request the performance of a particular service, in this case the replacement of a condenser motor. It should be noted that in accordance with the present invention the purchaser of the goods or services manages and controls the software program which embodies the present invention. The vendor is provided with a work order 100, detailing a particular goods or services. The vendor completes the task in accordance with the work order 102 and then through the use of a wide area network, such as the Internet accesses the automated bill submission system of the present invention. The vendor is initially presented with a start page 104 for providing basic information such as; invoice number, work date and invoice amount. Once completing the start page the vendor describes the work performed 106 by selecting from a pull down menu. As will be further described herein, the work performed includes the actions taken as well as the parts replaced. Once the vendor has completed his entries, a materials and expenses summary list is generated 108. The vendor then enters labor time and tax 110 to the invoice entries. After all entries are complete the vendor is presented with a completed invoice for review 112. The invoice is then submitted by the vendor 114. Once submitted the automated review function of the present invention reviews the material and expense charges and labor charges for all submitted items 116. If the charges submitted fall within the predetermined range, they are accepted 118 and a final invoice and payment date 119 are presented to the vendor. As will be further described herein, any charges that fall outside a predetermined range are adjusted to reflect a value within the predetermined range, 120. The adjusted values are presented to the vendor for approval, if the vendor does not accept the adjustments, then the system of the present invention will terminate the automated process 122 and instruct the vendor to contact the customer for further review and negotiation. If the vendor accepts the adjustment, he approves the revised invoice 124 and submits it for payment, 126. A key advantage to the vendor in utilizing the automated process is that a firm payment date is provided to the vendor upon approval of the revised invoice. In that way the vendor has a firm incentive for accepting any revisions rather than having to proceed through a manual vetting and negotiation process. Furthermore, the predetermined range of charges is based upon industry standard prices which have been determined from historical records for similar charges. The historical records are determined from categorizing and saving records from past service repair work. In addition, each new bill submitted becomes part of the database, and therefore the database in continually updated with new information. Because the price ranges maintained in the database are based upon historically accurate charges for the same or similar items the vendor can have confidence in the reasonableness of the charges.

Turning now to FIG. 2, there is shown a depiction of an exemplary start page in accordance with the present invention corresponding to step 104 above. The start page provides the vendor with several fields for entering information. In the exemplary start page depicted, there is shown an invoice number field 202, a work date field 204 and invoice amount field 206 and check boxes for information such as customer signature, 208 and store (or vendor) identification stamp 210. While the exemplary start page requires the information stated above, it will be understood that any number of data entry fields can be added to capture additional information regarding the vendor or invoice in question.

Figure 3:
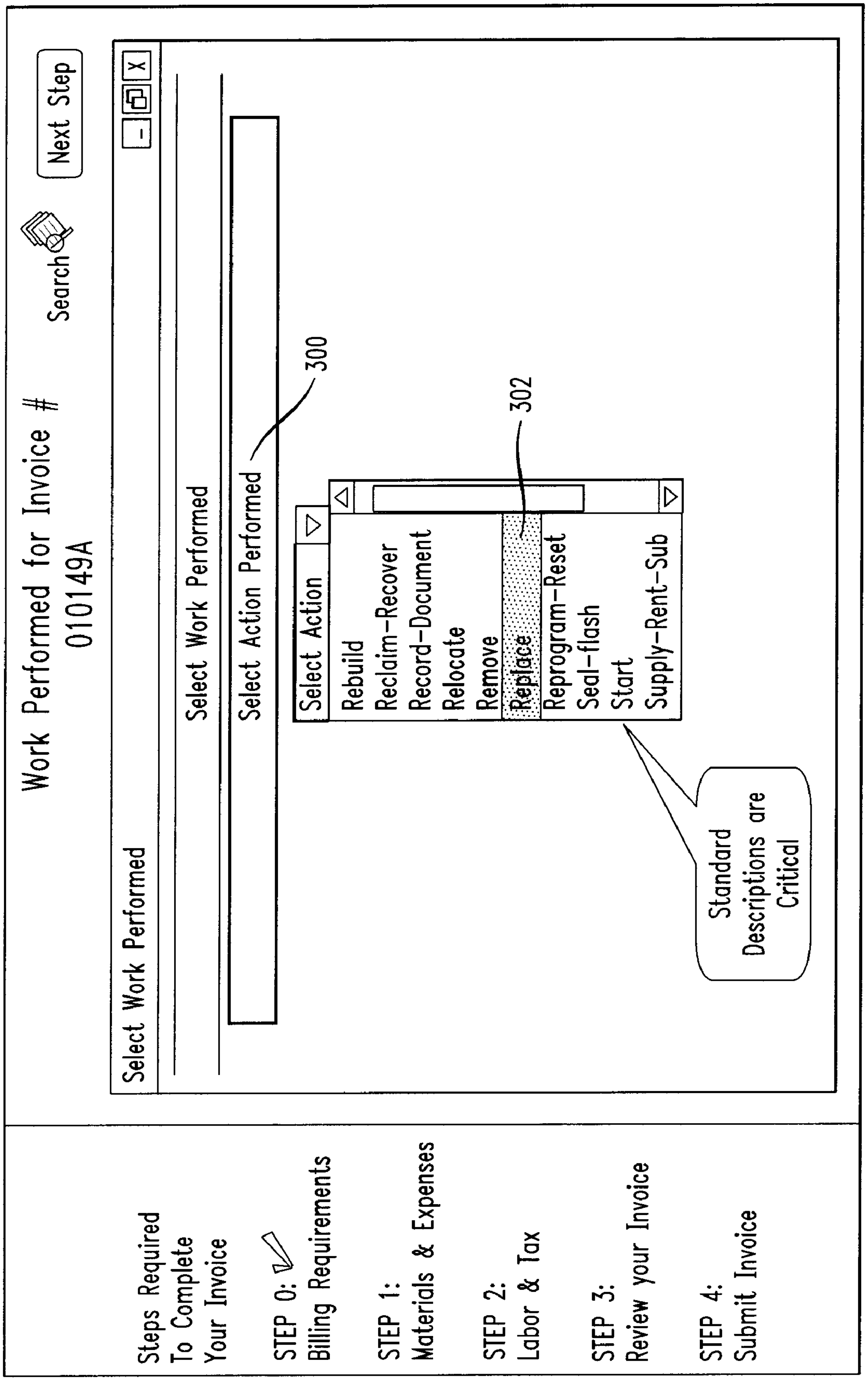
FIG. 3 is an exemplary Materials and Expense data entry page according to the present invention.

Turning now to FIG. 3, there is shown an exemplary Materials and Expense data entry page according to the present invention corresponding to step 106 of FIG. 1. The Materials and Expense data entry consists of several steps. The first step as shown in FIG. 3, depicts the entry of the action performed 300. The actions are selected from a pull down menu in order to provide standardized descriptions of all work actions taken by a vendor. In that way, uniform pricing can be associated with each such action and a standard database of charges for particular action can be built up and maintained. In the exemplary depiction of this description, the action selected is "replace" 302. It will be noted that the pull down menu contains a list of possible actions to be selected from. The list depicted is of course not all inclusive and can be modified and supplemented to suit the particular implementation of the current invention. Furthermore the list may be modified and supplemented over time to more closely match the needs of the particular use. It should be noted however, that the computer program embodying the present invention can only be modified, changed or supplemented by the entity controlling the software program, as described herein, this is the purchaser of the goods and services.

FIG. 4 depicts the second Materials and Expense entry step, specifically category of work performed. In this step the vendor selects a general category 400 that relates to the work performed by the vendor. As in the previous step, the general category of work performed is selected from a pull down menu in order to assure uniformity. In the exemplary depiction of this description, the action selected is "Motor-Condenser Fan" 402. As previously noted the pull down menu can be modified in accordance with the users needs.

Figure 5:
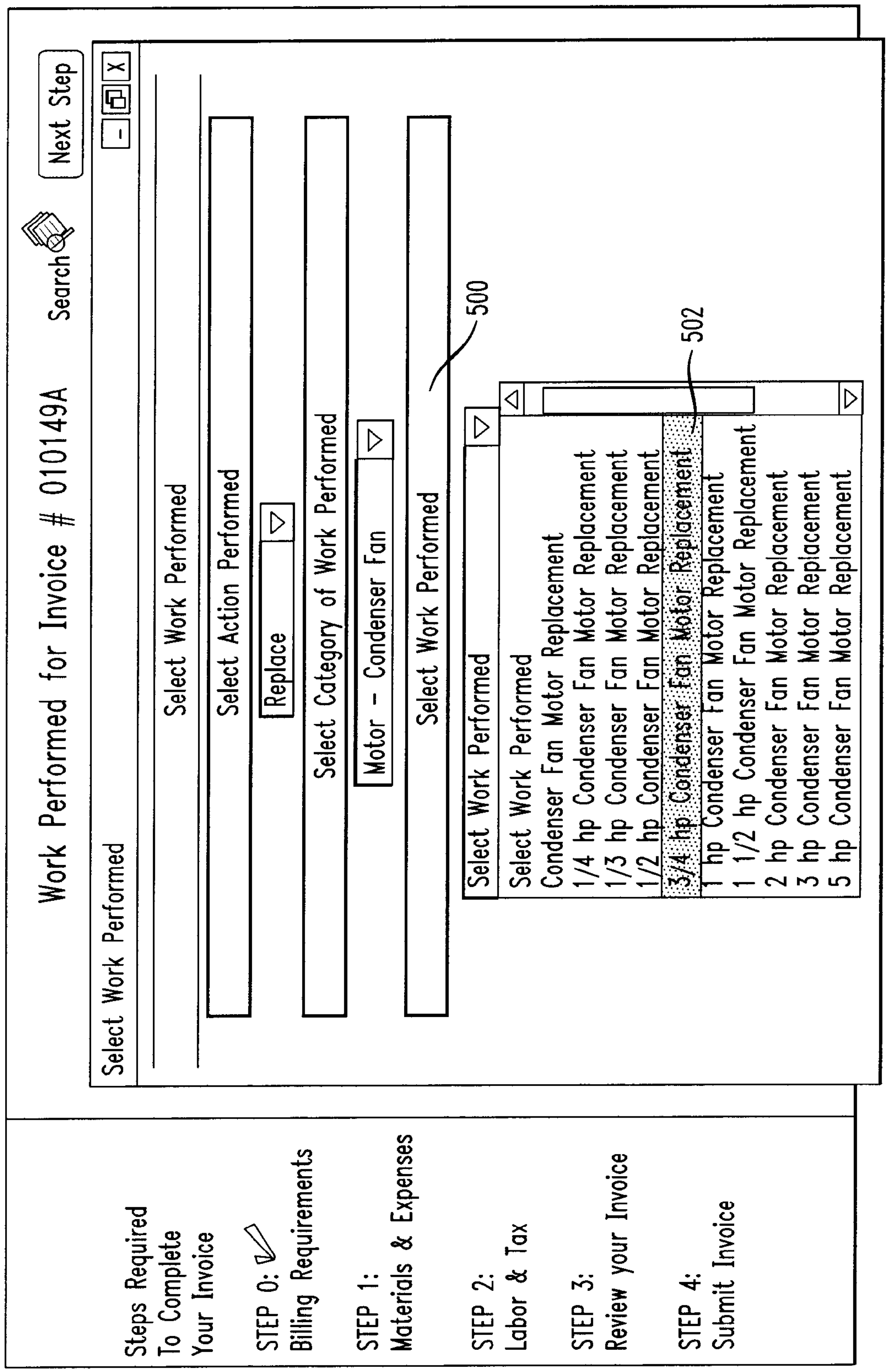
FIG. 5 is an additional exemplary Materials and Expense data entry page according to the present invention.

FIG. 5 depicts the selection of the third step of the Materials and Expense entry. Specifically, there is shown the selection of the work performed 500 by the vendor. In this exemplary depiction, the vendor selects "¾ hp Condenser Fan Motor Replacement" 502. As previously noted the pull down menu can be modified in accordance with the users needs.

FIG. 6 depicts the selection of the equipment entry 600 by the vendor. In this exemplary depiction, the vendor selects from the menu the make and model of the part replaced, specifically, O1/YORK/D3CGO48ND325B/NBXMI02299 602. As noted previously, the equipment is selected from a pull down menu to maintain uniformity. The pull down menu can as before, be modified to reflect the requirements of any particular user.

Turning now to FIG. 7 there is shown a depiction of an exemplary Materials and Expense summary pages. Once the vendor has completed the entry phase depicted in FIG. 3-6, the vendor reviews the entries on the summary pages to confirm correct entry. The summary page lists the; job code 700, which corresponds to the entry for the action taken, the work performed 702, and the equipment 704. The vendor can edit each entry by selecting the edit button, 706 or delete 708 an entry in order to insure accurate data entry. Once the vendor has completed his review and is satisfied with the accuracy of the entries he selects the "add Material or Expense" button to complete the materials and expense entry phase.

Figure 8:
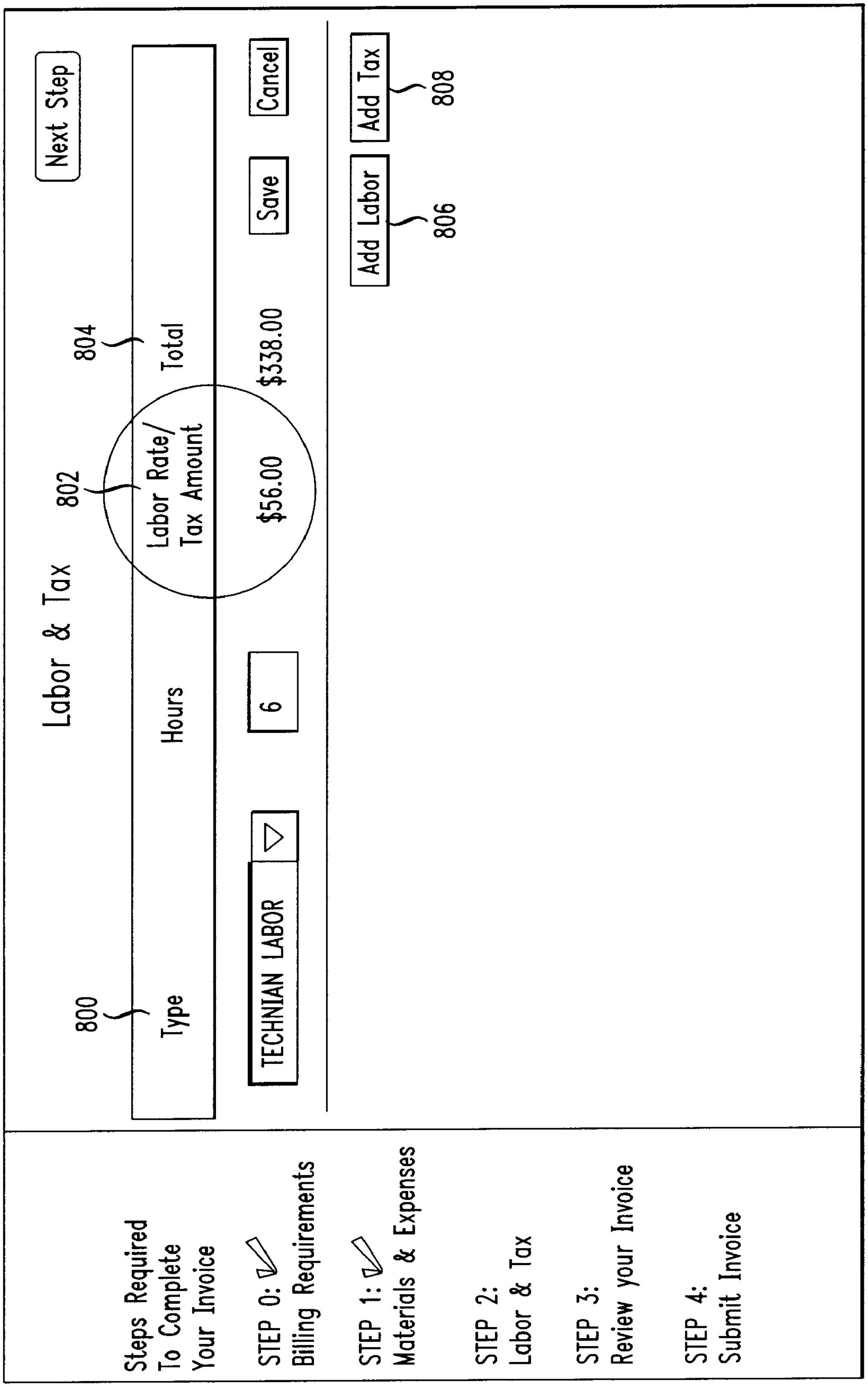
FIG. 8 is an exemplary Labor and Tax data entry page according to the present invention.

Turning now to FIG. 8, there is depicted an exemplary data entry page for labor and tax, corresponding to step 110 of FIG. 1. The vendor selects the type of labor from a pull down menu having a list of labor types 800. Each type is assigned a rate 802 in accordance with a predetermined value for that labor type. The rate is assigned from a dynamic database which is updated to account for market conditions, which provides for standardization in labor charges paid. Once the vendor enters an hour value 804 a total labor charge is calculated. The vendor then selects the "add labor" 806 and "add Tax" 808 buttons to move to the next step.

Turning now to FIG. 9 there is shown an exemplary review invoice corresponding to step 112 of FIG. 1 above. The review invoice provide the vendor with an opportunity to review all data previously entered, as described with respect to FIGS. 3-8 for accuracy as well as an invoice total. Upon completing his review, the vendor selects the next step button 900 to submit the invoice.

Figure 10:
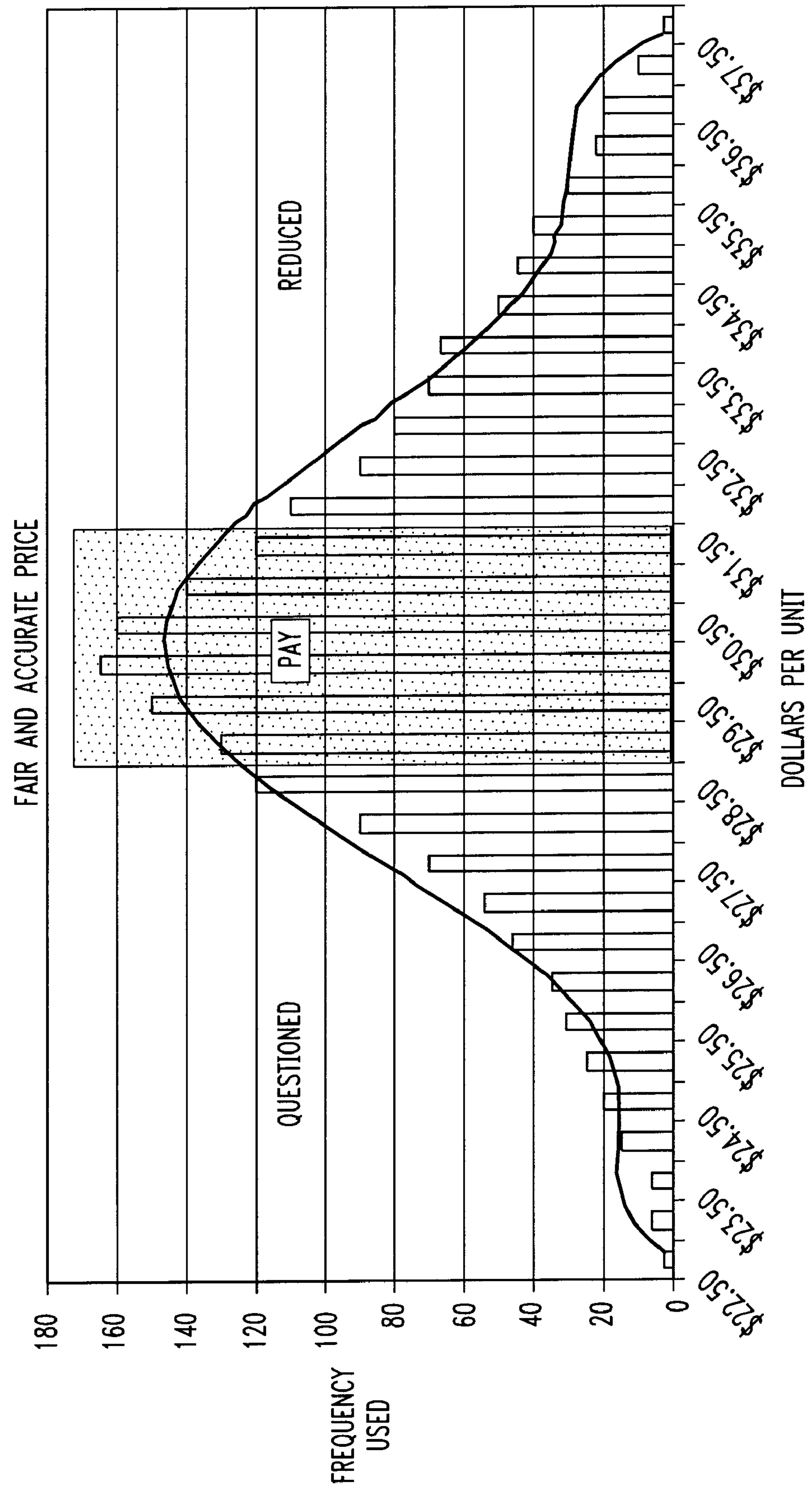
FIG. 10 is an exemplary price review function graph according to the present invention.

Turning now to FIG. 10 there is shown a chart depicting an exemplary price review function. The systems of the present invention includes a database of values for each work action and material expense. The database is a compilation of fair and reasonable charges within an industry for types of work, time of work and materials cost and is updated based on prior actual payments. In that way both industry standards are reflected in the database as well as the institutional knowledge of a particular business. For the purpose of this description one particular curve will be described, however one skilled in the art will appreciate that the description is applicable to each cost and time charge described herein. The curve depicted shows a distribution of pricing for a particular item with respect to a frequency for that item. The prices, as previously noted, are based on industry standards as well as previous actual payments. The values in this exemplary example are clustered about a mean value of 30.50 in a nearly normal distribution. Typically the initial price distribution would be set through a survey of historical records for the items in question. The price distribution may then be modified in accordance with updated price data to accurately reflect pricing for any particular parameter such as time, geographic location or market forces. In the example depicted, the values that are within approximately one standard deviation are regarded as payable charges, while those that are beyond one standard deviation on the positive x-axis are reduced and those beyond one standard deviation on the negative x-axis are questioned. It should be noted that while a normal distribution of prices is depicted for the purpose of this description, the pricing may fall within other distribution models. In addition, the range of payable, reduced and questioned charges may vary within alternate deviation parameters, in other words, one standard deviation may not be the limit for determining payable, reduced or questioned charges. Thus, in accordance with the present invention, when an invoice is submitted each material and labor charge is compared with a database of values to determine if it falls within the bounds of a payable charge, those outside the bounds are reduced or questioned as appropriate. In a particular aspect of the present invention, in order to determine the range of appropriate charges for a particular item, whether parts or labor, maintains a large database consisting of prior charges for the same or similar charges. In this way, the present invention is able to standardize pricing across non-standard charges. This is possible because the database is built from a large population sample of service repair records and each new charge is added to the database. Therefore the pricing population sample is continually updated. Furthermore, the present invention separates and delineates non-standard charges into categories in order to create a large database record with respect to specific items, such as hourly labor rate, and parts charges for components. For example, as in FIGS. 4-6 above, the part replaced is categorized in general to specific terms, from motor to condenser motor to the specific brand. Therefore, cross checks can be created within the database for prices of specific items as well as for general category of items.

Turning now to FIG. 11, there is shown an exemplary adjustment page in accordance with the present invention, in the example described an adjustment to the labor charge is proposed from 6 hours 1100 to 5.75 hours 1102. This adjustment would have been determined by comparison of the billed charge to a database of labor time for the specific work performed as described with respect to FIG. 10. The vendor can then select "Recalculate Invoice" in order to accept the adjustment, or "Request Assistance" in order to dispute the adjustment. If the vendor disputes the adjustment the automated system of the present invention will stop processing the invoice until further authorization from the customer. If the vendor approves the adjustment a final invoice is presented FIG. 12 to the vendor for review and approval. Upon approval, the vendor selects the "next step" button 1200 and receives a final invoice, FIG. 13, noting an approval and confirmation number, 1300. An important aspect of the present invention is the immediate and real time price adjustment made possible by the on-line automated system. This provides several key benefits. First the contractor is able to easily enter their billing information without resorting to a cumbersome manual process, therefore it can be done quickly and efficiently. The contractor is thus able to better recall the details regarding a specific job and more accurately reflect those details in his billing. Secondly, the automated system of the present invention is able to review the proposed bill immediately and if necessary propose an adjustment. Any adjustment is also accompanied by an indication of a particular payment date in return for acceptance of the adjustment. The contractor therefore is able to recall the work clearly, and accurately assess the validity of the proposed adjustment. The contractor can agree to the adjustment and be assured of a date certain for payment or disagree with the adjustment and be able to explain any special circumstance which gave rise to the charges because he is able to recall the details. For example, in accordance with the present invention, a contractor can easily enter a bill on the automated system soon after the work is completed. If upon entering his bill as outline in this description, a reduction is proposed, the contractor may dispute the reduction based upon special circumstances for the work. If for example the work was performed on an emergency basis over the weekend, at night, or during inclement weather the contractor will readily recall the details and be able to reject the adjustment and request assistance in accordance with the procedure describe for item 1106 above. Alternatively, if the contractor is satisfied that the adjustment represents a fair and reasonable price for his services, he can accept the adjustment and be assured of payment on a date certain.

Figure 14:
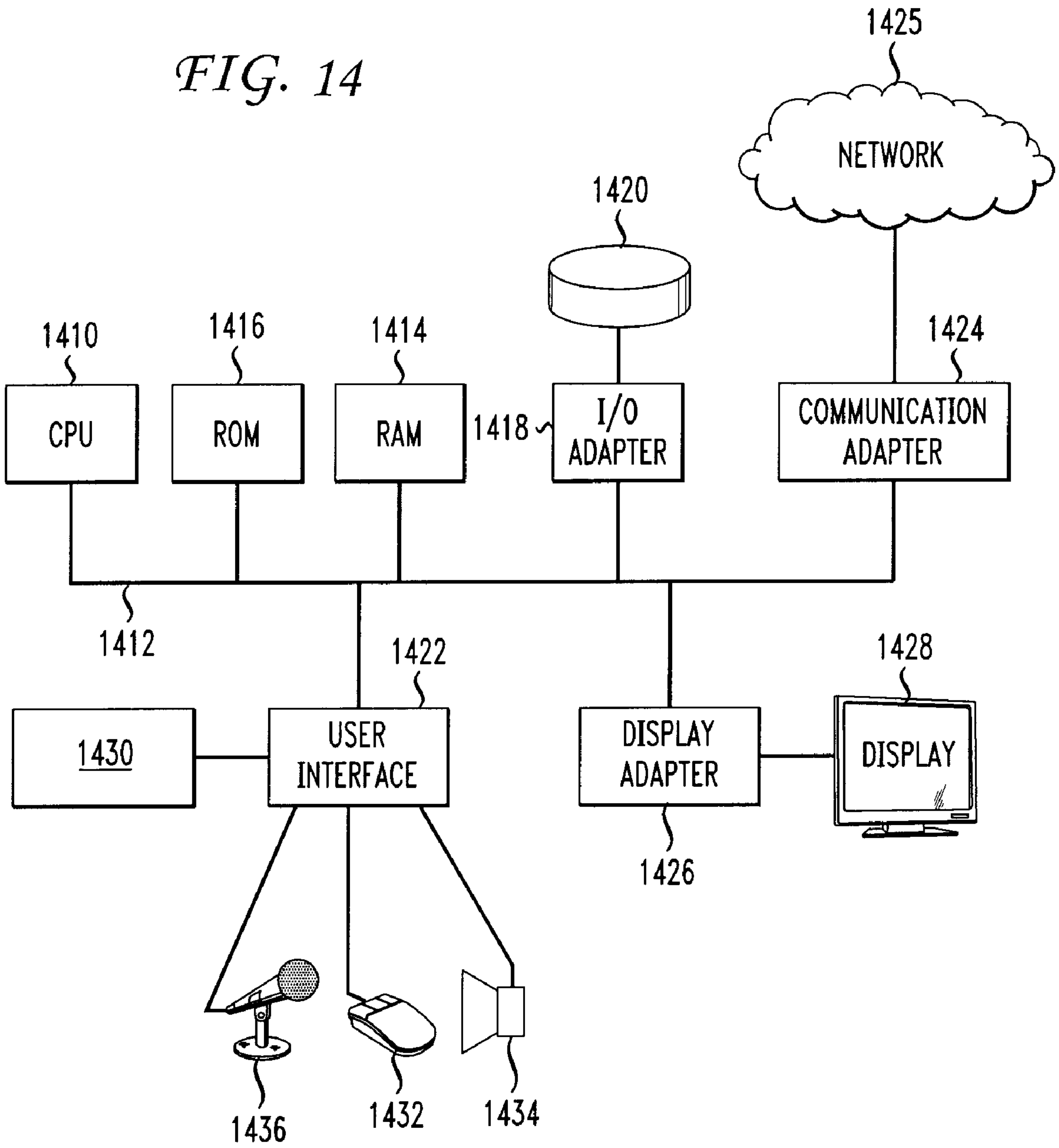
FIG. 14 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 14, which illustrates a typical hardware configuration of a workstation in accordance with a preferred embodiment having a central processing unitX10, such as a microprocessor, and a number of other units interconnected via a system bus 1412. The workstation shown in FIG. 14 includes a Random Access Memory (RAM) 1414, Read Only Memory (ROM) 1416, an I/O adapter 1418 for connecting peripheral devices such as disk storage units 1420 to the bus 1412, a user interface adapter 1422 for connecting a keyboard 1430, a mouse 1432, a speaker 1434, a microphone 1436, and/or other user interface devices such as a touch screen (not shown) to the bus 1412, communication adapter 1424 for connecting the workstation to a communication network 1425 (e.g., a data processing network) and a display adapter 1426 for connecting the bus 1412 to a display device 1428. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation.

HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, solutions using products such as Sun Microsystem's Java language can also be implemented.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology available for implementing the current invention that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

It will be appreciated that the present invention has been described herein with reference to certain preferred or exemplary embodiments. The preferred or exemplary embodiments described herein may be modified, changed, added to or deviated from without departing from the intent, spirit and scope of the present invention. It is intended that all such additions, modifications, amendments, and/or deviations be included within the scope of the claims appended hereto.

The invention claimed is:

1. A computer program containing code segments which when executed on a computer perform automated invoice settlement utilizing a network, the computer program embodied on a computer readable medium, the computer program comprising:

(a) a code segment for allowing a vendor to select from a group of options in order to enter invoice information utilizing a network, wherein the options include an action performed, a work category, a work performed, an equipment description, a labor time, and a labor type;

(b) a code segment for receiving the selected options and associating each of the selected options with an invoice value utilizing the network;

(b1) a code segment for providing an invoice summary including the selected options each with said invoice value and an invoice total;

(b2) a code segment for allowing said vendor to submit said invoice summary to the computer program for automated review, negotiation, and acceptance;

(c) a code segment for the computer program to compare said invoice value to a predetermined range of values for each said invoice value, said predetermined range of values are determined by considering one or more of the following factors selected from the list consisting of: a compilation of fair and reasonable values within an industry for the selected options, a geographic location, and a market force, wherein said predetermined range of values is continually updated to include accurate ranges of invoice values for said selected options having standard charges and non-standard charges;

(d) a code segment for the computer program to accept said invoice total when each said invoice value is within said predetermined range of values for the selected options;

(e) a code segment for the computer program to dynamically analyze said invoice values and automatically adjust one or more said invoice value when one or more said invoice value is greater or less than said predetermined range of values for the selected options; and (f) a code segment for allowing a purchaser to pay said invoice total accepted by the computer program and said invoice total adjusted by the computer program, wherein acceptance of said invoice total by said vendor provides said vendor with a firm payment date for said purchaser to pay said invoice total.

2. The computer program of claim 1, wherein said work performed includes said action performed and said work category.

3. The computer program of claim 1, wherein said equipment description is listed by a manufacturer and a model.

4. The computer program of claim 1, wherein said type of labor further includes a labor rate corresponding to said labor type, said rate being assigned by a dynamic database that is updated to account for market conditions.

5. The computer program of claim 1, wherein said invoice summary further provides an edit button and a delete button.

6. The computer program of claim 1, further comprising a database for storing said predetermined range of values for each said option.

7. The computer program of claim 1, further comprising a price distribution curve, wherein said price distribution curve graphically depicts said predetermined range of values with respect to a frequency of the selected options.

8. The computer program of claim 1, further comprising a crosscheck feature, said crosscheck feature being configured to check said invoice value by said work category.

9. The computer program of claim 1, wherein said predetermined range of values for said invoice value of the selected options is based on an industry standard, with said industry standard being determined by historical records that are continuously updated, saved, and categorized.

10. The computer program of claim 1, wherein the computer program terminates when said vendor rejects said invoice total.

11. A system for invoice settlement utilizing a network, comprising:

a computing device; and a computer program configured to provide automated invoice settlement utilizing a network, wherein said computer program includes:

(a) means for allowing a vendor to select from a group of options in order to enter invoice information utilizing a network, wherein the options include an action performed, a work category, a work performed, an equipment description, a labor time, and a labor type;

(b) means for the system to receive the selected options and associate each of the selected options with an invoice value utilizing the network;

(b1) means for the system to provide an invoice summary including an invoice total and the selected options each with said invoice value;

(b2) means for said vendor to submit said invoice summary to the system for automated review, negotiation, and acceptance;

(c) means for the system to compare said invoice value to a predetermined range of values for each said invoice value, said predetermined range of values are determined by considering one or more of the following factors selected from the list consisting of: a compilation of fair and reasonable values within an industry for the selected options, a geographic location, and a market force, wherein said predetermined range of values is continually updated to include accurate ranges of invoice values for said selected options having standard charges and non-standard charges;

(d) means for the system to accept said invoice total when each said invoice value is within said predetermined range of values for the selected options;

(e) means for the system to dynamically analyze said invoice values and automatically adjust one or more said invoice value when one or more said invoice value is greater or less than said predetermined range of values for the selected options; and (f) means for allowing a purchaser to pay said invoice total accepted by the system and said invoice total adjusted by the system, wherein acceptance of said invoice total by said vendor provides said vendor with a firm payment date for said purchaser to pay said invoice total;

wherein said computer program is embodied on a computer readable medium.

12. The system of claim 11, wherein said work performed includes said action performed and said work category.

13. The system of claim 11, wherein said equipment description is listed by a manufacturer and a model.

14. The system of claim 11, wherein said type of labor further includes a labor rate corresponding to said labor type, said rate being assigned by a dynamic database that is updated to account for market conditions.

15. The system of claim 11, wherein said invoice summary further provides an edit button and a delete button.

16. The system of claim 11, further comprising a database for storing said predetermined range of values for each said option.

17. The system of claim 11, further comprising a price distribution curve, wherein said price distribution curve graphically depicts said predetermined range of values with respect to a frequency of the selected options.

18. The system of claim 11, further comprising a crosscheck feature, said crosscheck feature being configured to check said invoice value by said work category.

19. The system of claim 11, wherein said predetermined range of values for said invoice value of the selected options is based on an industry standard, with said industry standard being determined by historical records that are continuously updated, saved, and categorized.

20. The system of claim 11, wherein the system terminates when said vendor rejects said invoice total.

* * * * *